United States Patent
Loftus et al.

(10) Patent No.: US 9,403,443 B2
(45) Date of Patent: Aug. 2, 2016

(54) CHARGE BALANCE SYSTEM AND METHOD

(71) Applicant: Ford Global Technologies, LLC, Dearborn, MI (US)

(72) Inventors: Michael Edward Loftus, Northville, MI (US); Fazal Urrahman Syed, Canton, MI (US); Michael Schamber, Milford, MI (US); Venkatapathi Raju Nallapa, Dearborn, MI (US); Shailesh Shrikant Kozarekar, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

(21) Appl. No.: 14/154,676

(22) Filed: Jan. 14, 2014

(65) Prior Publication Data

US 2015/0197163 A1  Jul. 16, 2015

(51) Int. Cl.
| | |
|---|---|
| H02J 7/00 | (2006.01) |
| H02J 7/04 | (2006.01) |
| B60L 11/18 | (2006.01) |
| B60K 6/00 | (2006.01) |
| B60L 7/14 | (2006.01) |
| B60L 11/12 | (2006.01) |
| B60L 11/14 | (2006.01) |

(52) U.S. Cl.
CPC ............... B60L 11/1862 (2013.01); B60K 6/00 (2013.01); B60L 7/14 (2013.01); B60L 11/12 (2013.01); B60L 11/14 (2013.01); B60L 11/1809 (2013.01); B60L 11/1866 (2013.01); H02J 7/00 (2013.01); H02J 7/0013 (2013.01); H02J 7/0014 (2013.01); B60L 2240/547 (2013.01); B60L 2240/549 (2013.01); H02J 7/0016 (2013.01); H02J 7/0021 (2013.01); Y02T 10/7005 (2013.01)

(58) Field of Classification Search
USPC ......... 320/118, 116, 122, 134, 126, 101, 103, 320/104, 117, 119, 120, 121, 127, 128, 320/136; 324/434, 425, 433
See application file for complete search history.

(56) References Cited

U.S. PATENT DOCUMENTS

| | | | |
|---|---|---|---|
| 7,400,113 B2 | 7/2008 | Osborne | |
| 8,963,499 B2 * | 2/2015 | Choi | H02J 7/0016 320/116 |
| 2005/0140335 A1 * | 6/2005 | Lee | H02J 7/0018 320/118 |
| 2008/0100258 A1 * | 5/2008 | Ward | H01M 10/465 320/101 |
| 2008/0203966 A1 * | 8/2008 | Ward | H02J 7/355 320/104 |
| 2010/0247988 A1 * | 9/2010 | Okumura | B60K 6/445 429/90 |
| 2011/0316483 A1 * | 12/2011 | Zhang | H01M 10/441 320/118 |
| 2013/0009600 A1 * | 1/2013 | Jeong | B60L 11/005 320/118 |
| 2013/0057218 A1 * | 3/2013 | Sawayanagi | G01R 31/362 320/118 |
| 2014/0042977 A1 * | 2/2014 | Kim | H02J 7/0068 320/134 |
| 2014/0049224 A1 * | 2/2014 | Hua | H02J 7/0068 320/136 |
| 2015/0244190 A1 * | 8/2015 | Yamamoto | H02J 7/0014 320/126 |

* cited by examiner

*Primary Examiner* — Alexis A Boateng
(74) *Attorney, Agent, or Firm* — David B. Kelley; Brooks Kushman P.C.

(57) ABSTRACT

A power system may perform charge balancing for a vehicle. The power system may include a battery including a plurality of modules, each module including a cell and associated resistive circuitry. The system may also include at least one controller configured to, in response to a cell achieving a threshold voltage and/or SOC, activate the associated resistive circuitry for the cell and reduce a charge current applied to the battery to prevent the cell from acquiring additional charge.

20 Claims, 3 Drawing Sheets

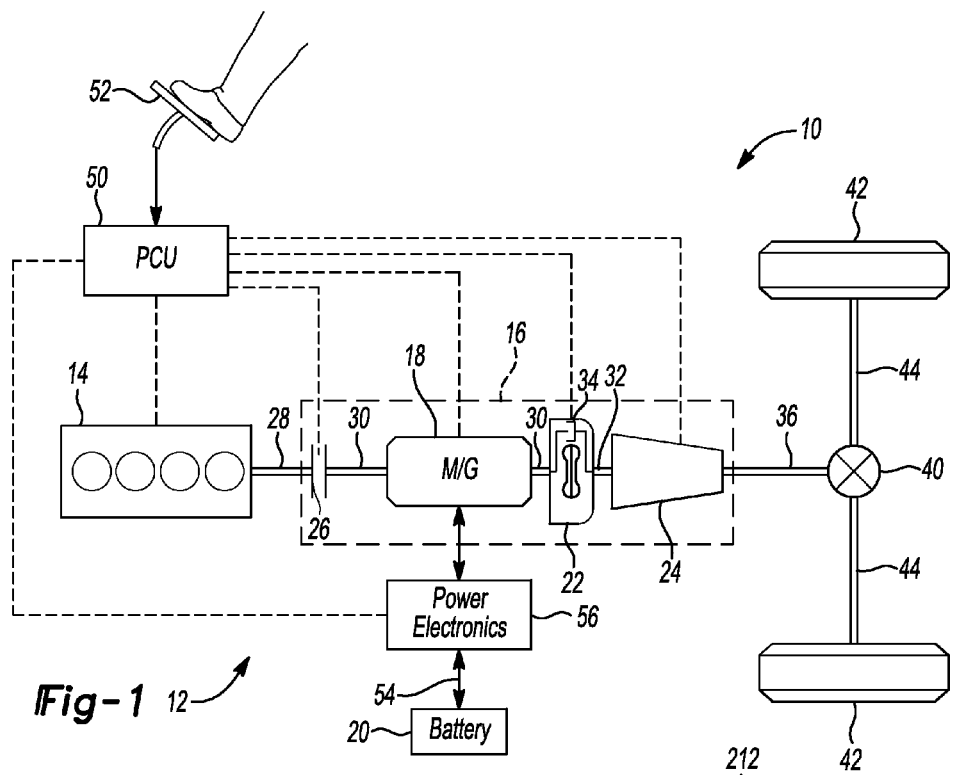
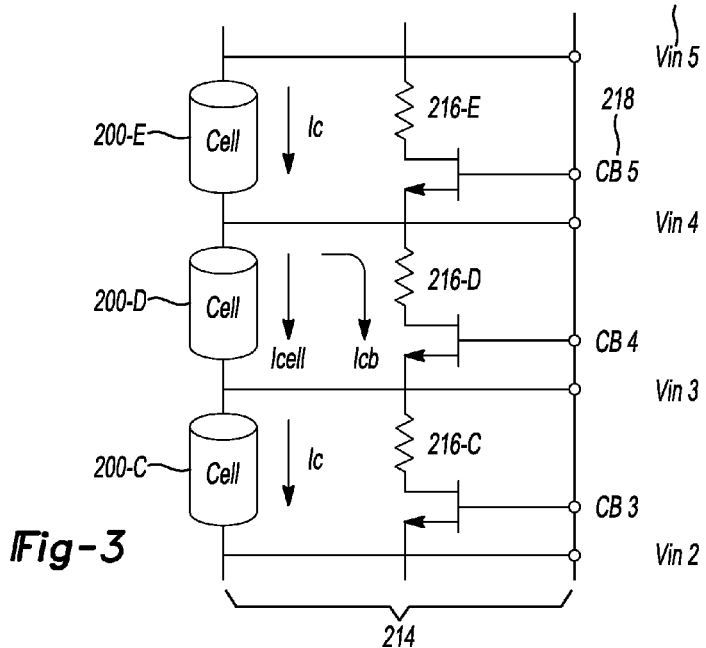
Fig-1
Fig-3

CHARGE BALANCE SYSTEM AND METHOD

TECHNICAL FIELD

This disclosure relates to charge balancing of a battery using a cell balancing circuit.

BACKGROUND

Electrified vehicles, including Battery-electric (BEV), Plug-in Hybrid Electric (PHEV) and traditional Hybrid Electric (HEV), employ a high-voltage traction battery to store energy. The traction battery is composed of multiple battery cells in at least one series string, such that the traction battery voltage is the sum of the voltages of the cells in series. In some cases, some cells of the battery may be charged to a greater voltage level than other cells. As the traction battery may be charged from a current source connected to the at least one series string, the charge level of the battery may be limited by the charge level of the most charged cells to avoid overcharging.

SUMMARY

A vehicle charge balancing power system may include a battery including a plurality of modules, where each module includes a cell and associated resistive circuitry. The power system may further include at least one controller configured to, in response to a cell achieving a threshold voltage, activate the associated resistive circuitry for the cell and reduce a charge current applied to the battery to prevent the cell from acquiring additional charge.

A method for performing charge balancing for a vehicle may include monitoring state of charge of a battery including a plurality of modules, each module including a cell and associated resistive circuitry. The method may further include activating, in response to a cell achieving a threshold voltage, the associated resistive circuitry for the cell, and reducing a charge current applied to the battery to prevent the cell from acquiring additional charge.

A vehicle may include an electric machine configured to generate motive power for the vehicle. The vehicle may also include a battery including a plurality of modules, each module including a cell configured to store energy for the electric machine and associated resistive circuitry. The vehicle may also include at least one controller configured to, in response to a cell achieving a threshold voltage, activate the associated resistive circuitry for the cell and reduce a charge current applied to the battery to prevent the cell from acquiring additional charge.

BRIEF DESCRIPTION OF THE DRAWINGS

FIG. 1 illustrates a schematic diagram of a hybrid electric vehicle;

FIG. 3 illustrates an exemplary detailed portion of the battery of FIG. 2 with an active charge balance circuit.

DETAILED DESCRIPTION

Figure 2:
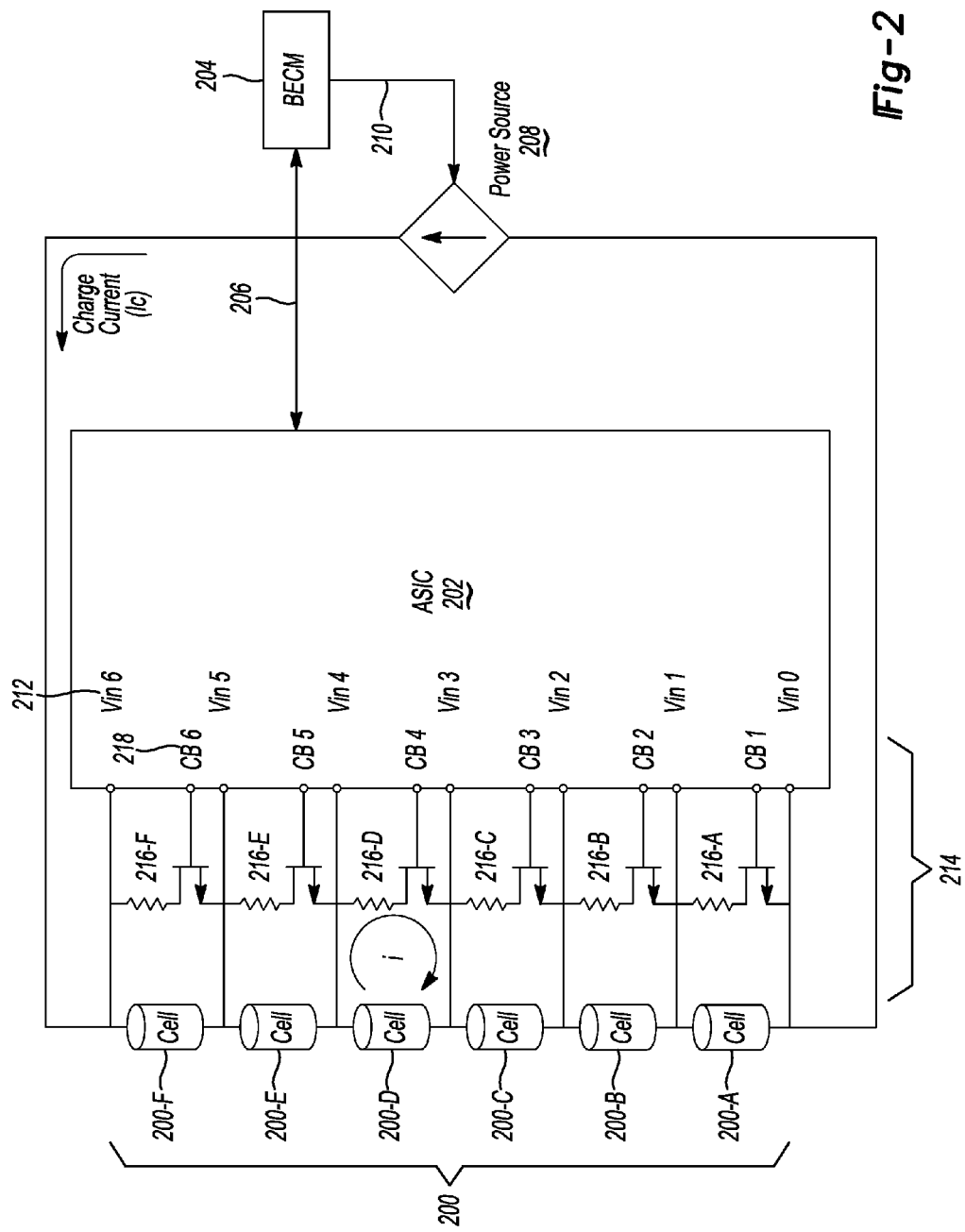
FIG. 2 illustrates an exemplary battery having a plurality of cells, a monitoring circuit and a battery energy control module included in the power electronics.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Individual cells of a traction or other battery may charge and discharge at different rates. An application-specific integrated circuit (ASIC) may be used to monitor individual cell voltages of a traction battery, as well as the full traction battery voltage. The ASIC may further include circuitry capable of concurrently discharging one or more cells through a fixed resistive load (e.g., one per cell). A battery energy control module (BECM) may be configured to receive the cell status information from the ASIC, and calculate information such as state of charge (SOC), charge power limit (CPL) and discharge power limit (DPL) of the traction battery. As the instantaneous capabilities of the traction battery are constrained by the extreme (highest/lowest SOC) cells, the BECM may be configured to utilize the information received from the ASIC to maintain consistent SOC for each cell in the traction battery. As one possibility, the BECM may be configured to command the ASIC to perform charge balancing on selected cells of the traction battery in a depletive method to selectively discharge the selected cells down to the SOC of the lowest charged cell.

An improved charge balancing system may utilize a configurable power source external to the traction battery to provide a BECM with additional charge management strategies. Using the configurable power source, the BECM may be configured to provide power to the battery while also commanding the ASIC to select cells of the battery to be connected through associated resistive loads, thereby allowing for different levels of charge or discharge to be applied to different cells of the battery. These additional charge management strategies may include maximally depletive, maximally-additive, or a combination of depletive, additive, and charge-neutral strategies. In addition to the maximally depletive and additive charging strategies, the BECM may allow for the selective application of limited-depletive and limited-additive strategies. As one example, in response to a cell achieving a threshold voltage, the BECM may be configured to command the ASIC to activate the associated resistive circuitry for the cell and reduce a charge current applied to the battery by the configurable power source to prevent the cell from acquiring additional charge, but allowing other cells of the battery to continue to charge at a slower rate.

The power source may be implemented as a low-current, controllable, current source. As some non-limiting possibilities, the external power source maybe implemented as one or more of an on-board solar panel with a controllable DC/DC converter, an on-board generator, an off-board solar panel with controllable DC/DC converter, and an AC plug-in charging device. By using the charge balancing circuitry of the ASIC in conjunction with control of the external power source, the BECM may implement several new charging and charge balancing options to use with a traction battery of a vehicle.

Referring to FIG. 1, a schematic diagram of a hybrid electric vehicle (HEV) 10 is illustrated according to an embodiment of the present disclosure. It should be noted that the disclosed techniques are applicable to other hybrid vehicle configurations, and that the HEV 10 as illustrated herein is only exemplary. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like.

Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

FIG. 2 illustrates an exemplary battery 20 having a plurality of cells 200-A through 200-F (collectively 200), a monitoring ASIC 202 and a BECM 204 included in the power electronics 56. The traction battery 20 may be charged by connecting the battery 20 to a power source 208. During charging, electrical current may be passed by the power source 208 through the individual cells 200 in series to increase each individual cell 200 SOC, and hence the overall SOC of the battery 20.

The power source 208 may be external to the battery 20 and may include one or more of an on-board solar panel, an on-board generator, an off-board solar panel, and an A/C plug-in charging device. The power source 208 may further be controllable to provide a varying level of current based on a current control input 210 to the power source 208. Using the current control input 210, the level of current provided by the power source 208 (if any) may be selected by the BECM 204. As one possibility, the power source 208 may include a configurable current regulator which allows the power source 208 to limit charge current to a particular level selected by the BECM 204. In some cases the configurable current regulator may allow for the selection of current on the order of milliamps, while in other cases the power source 208 may support specification of current on the order of tenths or hundredths of an Amp.

Individual cells 200 of the battery 20 may charge and discharge at different rates. Accordingly, the ASIC 202 may be configured to monitor individual voltages of the cells 200, as well as the voltage of the full traction battery 20. To perform monitoring of the cells 200, the ASIC 202 may be connected between each cell 200 of the battery 20 as well as to the battery 20 as a whole. The ASIC 202 may draw operational power from the cells 200 being monitored, and may monitor the voltages of the cells 200. For example, as illustrated the cell 200-A may be monitored according to the $V_{in0}$ and $V_{in1}$ connections 212, the cell 200-B may be monitored according to the $V_{in1}$ and $V_{in2}$ connections 212, the cell 200-C may be monitored according to the $V_{in2}$ and $V_{in3}$ connections 212, and so on. In some cases, multiple ASIC 202 components may be strung together in series to facilitate the monitoring of larger series strings of cells 200 than may be monitored by way of a single ASIC 202. One exemplary ASIC 202 may be the AD7280 provided by Analog Devices, but other ASICs 202 or other circuitry performing these monitoring functions may be utilized.

The ASIC 202 may be configured to receive requests for the cell 200 voltages over a connection 206 between the ASIC 202 and the BECM 204. The ASIC 202 may be further configured to provide information indicative of the voltages of the cells 200 monitored by the one or more ASICs 202 over the connection 206 responsive to the request. The BECM 204 may be configured to utilize the information received from the ASIC 202 via the connection 206 to calculate information such as SOC, CPL, and DPL of the traction battery 20.

As individual cells 200 of the battery 20 may charge and discharge at differing rates, the BECM 204 may be configured to utilize charge management strategies to maintain consistent SOC for each cell 200 in the traction battery 20. This may be done by the BECM 204 to avoid constraints in the instantaneous capabilities of the traction battery 20 due to cells 200 having outlying high or low SOC.

For sake of explanation, the battery 20 may be referred to as including a plurality of modules, where each module includes a cell 200 and a charge balance circuit 214 including associated resistive load 216 circuitry. The charge balance circuit 214 for each module may include a respective fixed resistive load 216 through which the cell 200 may be discharged, as well as a switch (e.g., a transistor or the like) to allow the resistive load 216 to be wired around the respective cell 200. The ASIC 202 may further include control balancing outputs 218 to individually activate or deactivate the charge balance circuits 214 associated with the cells 200. Accordingly, the switching of the charge balance circuits 214 may be controllable by the ASIC 202 via commands received over the connection 206 from the BECM 204. As illustrated, the ASIC 202 includes six control balancing outputs 218, CB1 through CB6, each configured to activate charge balance circuits 214 for cells 200-A through 200-F, respectively, upon control over the connection 206 from the BECM 204.

When no power is being provided to the battery 20, the BECM 204 may command the ASIC 202 over the connection 206 to perform charge balancing on the cells 200 of the traction battery 20 in a depletive method. By using the control balancing outputs 218 to selectively invoke charge balance circuits 214 for overcharged cells 200, the BECM 204 may accordingly cause the ASIC 202 to discharge the overcharged cells 200 down to the SOC of the lesser charged cells 200. As illustrated, the cell 200-D of the battery 20 may be discharged through connection of the resistive load 216-D between $V_{in3}$ and $V_{in4}$ around the cell 200-D, e.g., due to activation of the corresponding charge balancing circuit 214 for the cell 200-D according to the CB4 control output 218 provided by the ASIC 202.

Moreover, by introducing the power source 208 external to the traction battery 20, the BECM 204 may be configured to utilize the charge balancing circuits 214 to provide additional charging strategies to improve charge balancing. As explained in detail below, with the power source 208, the BECM 204 may be configured to utilize one or more of depletive, maximally-additive, or a combination of depletive, additive, and charge-neutral strategies. In addition to the maximally depletive and additive charging strategies, the BECM 204 may be configured to support the selective application of limited-depletive and limited-additive charge balancing strategies.

FIG. 3 illustrates an exemplary detailed portion of the battery 20 of FIG. 2 with an active charge balance circuit 214-D for cell 200-D. As illustrated, the charge current from the power source 208 is labeled as $I_c$, the current through a cell 200-D of the battery 20 is labeled as $I_{cell}$, and the current through the charge balance circuitry resistive load 216-D is labeled as $I_{cb}$. Accordingly, the charge current $I_c$ is equal to $I_{cell}+I_{cb}$. Moreover, by Ohm's Law, $I_{cb}=V_{cell}/R_{cb}$, where $I_{cb}$ is the current through the charge balance circuitry 216-D in Amps, $V_{cell}$ is the potential difference across the cell 200-D measured in Volts, and $R_{cb}$ is the resistance of the resistive load 216-D in Ohms. For sake of explanation, let the resistance $R_{cb}$ of the resistive load 216-D of the charge balance circuitry 214-D be equal to a nominal 217 Ohms, let the nominal cell 200 voltage be equal to 3.7 Volts, and let $V_{max}$ be equal to a voltage the cells 200 are desired to remain below. In some cases, the $V_{max}$ may be above the nominal charged voltage (e.g., indicative of an overcharged cell 200 such as on the order of 4.1 Volts depending on temperature or other conditions), while in other cases the $V_{max}$ may be below the nominal charged voltage (e.g., set to an intermediate level of charge to allow for absorption of energy from regenerative braking in FHEV vehicles). It should be noted, however, that actual battery 20 behavior may be determined by specific cell 200 voltages, charge currents, and resistive load 216-D selection.

A maximal discharge strategy may be supported by the BECM 204 in situations where the charge current $I_c$ is zero. In the maximal discharge strategy, the cell current through the charge balance circuitry 214 may be dictated by the cell voltage through the resistive load 216. As $I_{cb}=V_{cell}/R_{cb}$, at a nominal cell voltage of 3.7 Volts and with a resistive load 216 of 217 Ohms, $I_{cb}$ would nominally equal 0.017 Amps. Thus, cells 200 for which the charge balance circuit 214 is active may discharge at the nominal rate, while cells 200 for which the charge balance circuit 214 is inactive may neither charge nor discharge.

A limited discharge strategy may be supported by the BECM 204 with the introduction of a charge current $I_c$ greater than zero but less than the nominal 0.017 Amps. Assuming nominal values and an exemplary charge current $I_c$ of 0.010 Amps, the cell current may be calculated as follows:

$$I_{cell} = I_c - (V_{cell}/R_{cb})$$

$$I_{cell} = 0.010 - (3.7/217)$$

$$I_{cell} = -0.007 \text{ Amps}$$

Accordingly, with the introduction of the exemplary charge current (e.g., 0.010 Amps) less than the nominal charge current, the cell 200 for which the charge balance circuit 214 is active may now discharge at a slower rate (e.g., 0.007 Amps instead of the nominal 0.017 Amps). Moreover, cells 200 for which the charge balance circuit 214 is inactive may charge at the rate of the exemplary charge current $I_c$ (e.g., 0.010 Amps).

A charge neutral strategy may be supported by the BECM 204 with the introduction of a charge current $I_c$ equal to the nominal 0.017 Amps. Assuming nominal values, the cell 200 current may be calculated as follows:

$$I_{cell} = I_c - (V_{cell}/R_{cb})$$

$$I_{cell} = 0.017 - (3.7/217)$$

$$I_{cell} = 0.0 \text{ Amps}$$

Accordingly, in the charge neutral strategy the cell 200 may neither charge nor discharge. Moreover, cells 200 for which the charge balance circuit 214 is inactive may charge at the rate of the charge current $I_c$ (e.g., 0.017 Amps).

A limited charge strategy may be supported by the BECM 204 with the introduction of a charge current $I_c$ greater than the nominal 0.017 Amps. Assuming nominal values and a charge current $I_c$ of 0.030 Amps, the cell 200 current may be calculated as follows:

$$I_{cell} = I_c - (V_{cell}/R_{cb})$$

$$I_{cell} = 0.030 - (3.7/217)$$

$$I_{cell} = 0.013 \text{ Amps}$$

Accordingly, in the limited charge strategy the cell 200 for which the charge balance circuit 214 is active may charge at a lower current (e.g., 0.013 Amps) than the applied charging current $I_c$ (e.g., 0.030 Amps). Moreover, cells 200 for which the charge balance circuit 214 is inactive may charge at the rate of the charge current $I_c$ (e.g., 0.030 Amps).

A maximal charge strategy may be supported by the BECM 204 with the introduction of a charge current $I_c$ greater than the nominal 0.017 Amps and without the activation of the charge balancing circuit 214. Since the charge balancing circuit is inactive, the charge current $I_c$ flows through the cell 200.

$$I_{cell} = I_c - (V_{cell}/R_{cb})$$

$$I_{cell} = I_c$$

Accordingly, in the maximal charge strategy each cell 200 may charge at the applied charging current $I_c$ (e.g., 0.030 Amps).

Figure 4:
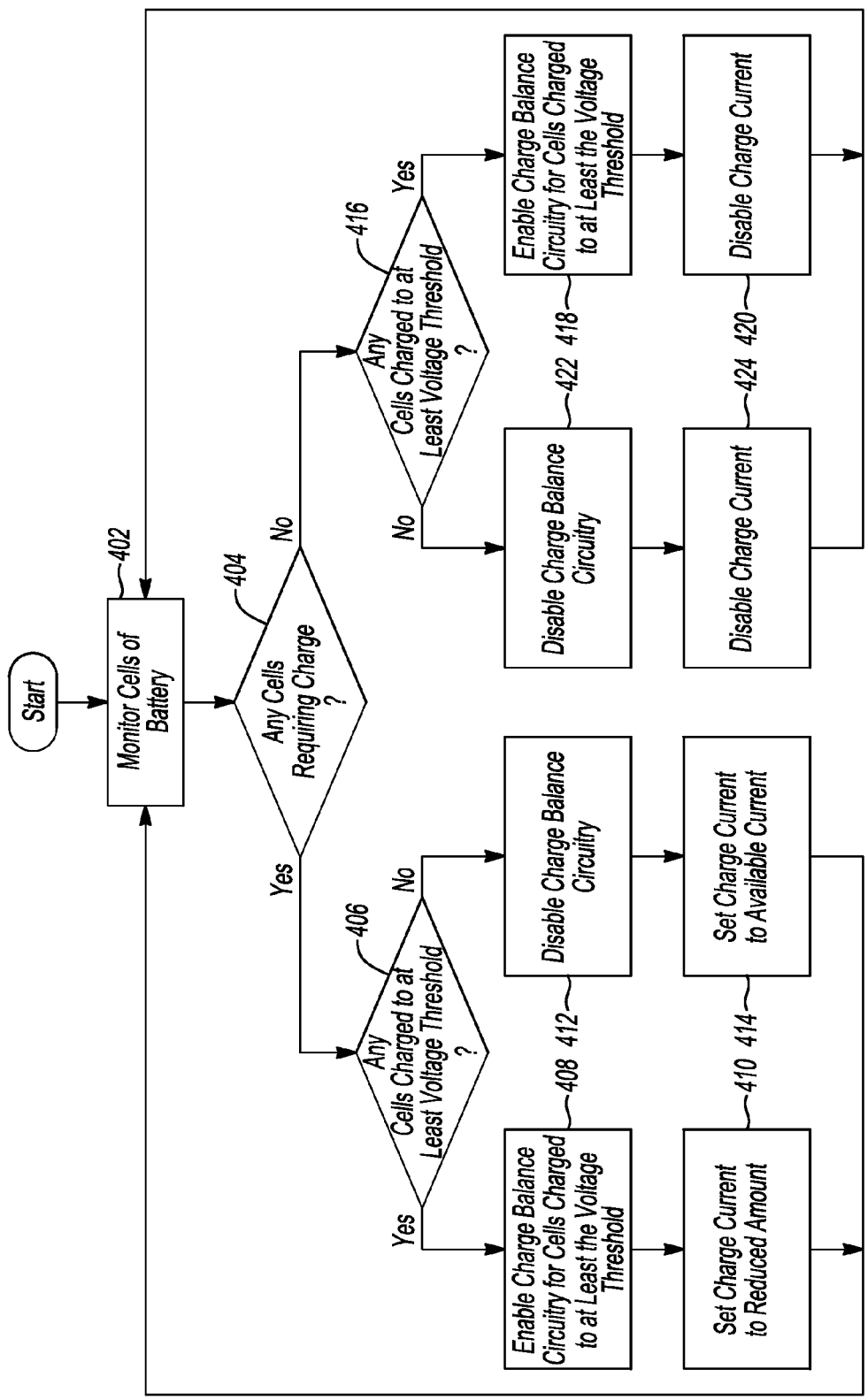
FIG. 4 illustrates an exemplary process for utilizing a configurable power source external to the traction battery to provide a charge balancing system with additional charge management features.

FIG. 4 illustrates an exemplary process 400 for utilizing a configurable power source 208 external to the traction battery 20 to provide a charge balancing system with additional charge management features. The process 400 may be performed, for example, by the BECM 204 in communication with an ASIC 202 monitoring cells 200 of a traction battery 20 and also in communication with the configurable power source 208.

At block 402, the BECM 204 monitors the cells 200 of the battery 20. For example, the BECM 204 may be configured to command the ASIC 202 over the connection 206 to acquire voltage samples, and the ASIC 202 may be configured to receive the request and return the measurements to the BECM 204 over the connection 206. The BECM 204 may be configured to request the voltage status from the ASIC 202 periodically. As one possibility, the BECM 204 may be configured to wake periodically (e.g., every 30 minutes when the vehicle is off, more often when the vehicle is on, etc.), and request updated samples from the ASIC 202. The ASIC 202 may likewise be configured to monitor individual voltages of the cells 200 using the $V_{in}$, connections 212, and provide the requested information to the BECM 204 to allow the BECM 204 to identify state of charge (SOC), charge power limit (CPL) and discharge power limit (DPL) information regarding the status of the cells 200 of the traction battery 20.

At decision point 404, the BECM 204 determines whether any cells 200 require additional charge. For example, the BECM 204 may determine whether any cells are charged below a threshold voltage. As one possibility, the threshold voltage may be set to a maximum allowable cell 200 voltage $V_{max}$ (e.g., 3.17 Volts) for applications such as charging a battery 20 of a PHEV or BEV vehicle. As another possibility, the threshold voltage may be set to a mid-level or other intermediate amount of cell 200 charge to allow for absorption of energy from regenerative braking (such as in FHEV vehicles). If any cells 200 require additional charge to reach the threshold voltage, then charging may be required and control passes to decision point 406. Otherwise, if no charging is required, control passes to decision point 416.

At decision point 406, the BECM 204 determines whether any cells 200 are charged to at least the threshold voltage. If any cells 200 are charged to at least the threshold voltage, then charge balancing may be required in addition to charging and control passes to block 408. Otherwise, control passes to block 412.

At block 408, the BECM 204 enables charge balancing for the cells 200 determined to be charged to at least the threshold voltage. For example, the BECM 204 may command the ASIC 202 over the connection 206 to cause the ASIC 202 to use the control balancing outputs 218 to engage charge balance circuits 214 for each cell 200 determined to be charged to at least the threshold voltage, to switch in a respective fixed resistive load 216 through which each such cell 200 may be connected.

At block 410, the BECM 204 reduces the charge current applied to the battery 20 to prevent the cells 200 charged to at least the threshold voltage from acquiring additional charge. As one possibility, the BECM may specify the charge current from the configurable power source 208 to be the minimum of the available current from the configurable power source 208 and $V_{max}/R_{cb}$. The BECM 204 may be further configured to apply the set charge current to the configurable power source 208. For example, the BECM 204 may control a current control input 210 to a configurable current regulator of the power source 208, to allow the power source 208 to provide the charge current at the specified level. After block 410, control passes to block 402.

At block 412, the BECM disables charge balancing for the cells 200. For example, the BECM 204 may command the ASIC 202 over the connection 206 to cause the ASIC 202 to disengage all or all active charge balancing circuits 214, thereby removing any previously connected resistive loads 216 from the cells 200 of the battery 20.

At block 414, the BECM 204 specifies the charge current from the configurable power source 208 to the available current from the configurable power source 208. As no cells are charged to at least the threshold voltage, the BECM 204 may be configured to either not limit the charge current (e.g., not limiting the charge current to $V_{max}/R_{cb}$) or to limit the charge current to a higher value that allows for at least some charging of all cells 200, allowing the BECM 204 to be placed in various charging strategies, such as the maximal charge strategy. The BECM 204 may be further configured to apply the set charge current to the configurable power source 208. For example, the BECM 204 may control a current control input 210 to a configurable current regulator of the power source 208, to allow the power source 208 to provide the charge current at the specified level. After block 414, control passes to block 402.

At decision point 416, the BECM 204 determines whether any cells 200 are charged to at least the threshold voltage. If any cells 200 are charged to at least the threshold voltage, then charge balancing may be required and control passes to block 418. Otherwise, control passes to block 422.

At block 418, the BECM 204 enables charge balancing for the cells 200 determined to be charged to at least the threshold voltage. For example, the BECM 204 may command the ASIC 202 over the connection 206 to cause the ASIC 202 to use the control balancing outputs 218 to engage charge balance circuits 214 for each cell 200 determined to be charged to at least the threshold voltage, to switch in a respective fixed resistive load 216 through which each such cell 200 may be connected.

At block 420, the BECM 204 disables the charge current. For example, the BECM 204 may control a current control input 210 to the configurable current regulator of the power source 208, to inform the power source 208 to discontinue the charge current. After block 420, control passes to block 402.

At block 422, the BECM 204 disables charge balancing for the cells 200. For example, the BECM 204 may command the ASIC 202 over the connection 206 to cause the ASIC 202 to disengage the charge balancing circuits 214, thereby removing any connected resistive loads 216 from the cells 200 of the battery 20.

At block 424, the BECM 204 disables the charge current. For example, the BECM 204 may control a current control input 210 to the configurable current regulator of the power source 208, to inform the power source 208 to discontinue the charge current. After block 424, control passes to block 402. Variations on the process 400 are possible. As one example, if no cells 200 require charge, the decision point 404 may pass control back to block 402.

Thus, by controlling the charging current of a configurable power source 208 and selectively activating the charge balancing circuitry 214 of specific cells, the BECM 204 may utilize greater control over both charging the battery 20 and charge balancing of the battery 20. As performance of the traction battery 20 may be limited to lowest or highest cell 200 SOC, traction battery 20 performance may be improved due to greater consistency in cell-to-cell SOC. Moreover, the longevity of the traction battery 20 may be improved due to greater control of the battery pack SOC.

As different charging strategies are possible that allow for charging cells with a lower SOC at a relatively greater rate than cells 200 that are charged or nearly charged, waste of cell 200 energy as heat may be avoided when charge balancing the traction battery 20. For example, by use of the charge balancing circuitry 214, multiple charge rates may be possible to be utilized concurrently by the BECM 204, as opposed to a single charging rate. Thus, a charge management strategy may be configured to simultaneously charge balance cells 200 while still charging (i.e., increasing SOC) of the entire battery pack. Moreover, by use of the charge balancing circuitry 214, multiple discharge rates may also be possible to be utilized concurrently by the BECM 204 when performing charge balancing, as opposed to a single discharge rate. Yet further, one or more cells 200 of the battery 20 may be charged while one or more cells 200 are discharged.

A more aggressive (e.g., higher charge balancing current, less charging time) charge balancing system may be designed with certain adjustments to the charge balancing circuit 214. For example, a lower value of the load resistance 216 $R_{cb}$ of the charge balancing circuit 214 may be selected to increase the charge balancing current $I_{cb}$. As another example, multiple levels of charge balancing load resistance 216 $R_{cb}$ and corresponding control balancing outputs 218 from the BECM 204 may be utilized to allow for greater control of different charging strategies through the cells 200 of the battery pack 20.

Further, as the configurable power source 208 may be an on-board power source (e.g., a solar cell array, a 12 Volt battery, an on-board generator capable of milliamp current resolution, etc.) the ability to utilize the configurable power source 208 may allow the BECM 204 to charge the battery 20 while the vehicle 10 is disconnected from the electrical power grid (as is typically expected for FHEVs as opposed to PHEVs or BEVs) while the vehicle is driving (e.g., during key-on) while at the same time performing a charge balancing strategy to maintain relative SOC of the cells 200 of the battery 20.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle charge balancing power system comprising:
a battery including a plurality of modules, each module including a cell and associated resistive circuitry having a predefined resistance; and
at least one controller configured to, in response to a cell achieving a threshold voltage, activate the associated resistive circuitry for the cell and reduce a charge current applied to the battery to no greater than the threshold voltage divided by the predefined resistance.

2. The power system of claim 1, further comprising an adjustable power source configured to provide the charge current to the battery, wherein the at least one controller is further configured to command the power source to reduce the charge current applied to the battery.

3. The power system of claim 2, wherein the adjustable power source includes an on-board solar panel, an on-board generator, an off-board solar panel, or an off-board charging device.

4. The power system of claim 1, wherein the at least one controller is further configured to disable the charge current applied to the battery in response to the cells of the battery being balanced and the battery being fully charged.

5. The power system of claim 1, wherein the at least controller is further configured to reduce the charge current applied to the battery to less than the threshold voltage divided by the predefined resistance, thereby allowing discharge of the cells of the battery achieving the threshold voltage and charge of at least one other cell of the battery.

6. The power system of claim 1, wherein the at least controller is further configured to reduce the charge current applied to the battery to the threshold voltage divided by the predefined resistance, thereby allowing neither charge nor discharge of the cells of the battery achieving the threshold voltage and charge of at least one other cell of the battery.

7. The power system of claim 1, wherein the threshold voltage is a nominal charged cell voltage or has a value less than the nominal charged cell voltage to allow for absorption of energy from regenerative braking.

8. A method for performing charge balancing for a vehicle comprising:
monitoring state of charge of a battery including a plurality of modules, each module including a cell and associated resistive circuitry having a predefined resistance;
activating the associated resistive circuitry for one of the cells in response to the one of the cells achieving a threshold voltage; and
reducing a charge current applied to the battery to no greater than the threshold voltage divided by the predefined resistance to prevent the one of the cells from acquiring additional charge.

9. The method of claim 8, further comprising commanding an adjustable power source providing the charge current to the battery to reduce the charge current applied to the battery.

10. The method of claim 9, wherein the adjustable power source includes an on-board solar panel, an on-board generator, an off-board solar panel, or an off-board charging device.

11. The method of claim 8, wherein the at least one controller is further configured to disable the charge current applied to the battery in response to the cells of the battery being balanced and the battery being fully charged.

12. The method of claim 8, further comprising reducing the charge current applied to the battery to less than the threshold voltage divided by the predefined resistance, thereby allowing discharge of the cells of the battery achieving the threshold voltage and charge of at least one other cell of the battery.

13. The method of claim 8, further comprising reducing the charge current applied to the battery to the threshold voltage divided by the predefined resistance, thereby allowing neither charge nor discharge of the cells of the battery achieving the threshold voltage and charge of at least one other cell of the battery.

14. The method of claim 8, further comprising setting the threshold voltage to a nominal charged cell voltage or a value less than the nominal charged cell voltage to allow for absorption of energy from regenerative braking.

15. A vehicle comprising:
an electric machine configured to generate motive power for the vehicle;
a battery including a plurality of modules, each module including a cell configured to store energy for the electric machine and associated resistive circuitry having a predefined resistance; and
at least one controller configured to, in response to one of the cells achieving a threshold voltage, activate the associated resistive circuitry for the one of the cells and reduce a charge current applied to the battery to no greater than the threshold voltage divided by the predefined resistance to prevent the one of the cells from acquiring additional charge.

16. The vehicle of claim 15, further comprising an adjustable power source configured to provide the charge current to the battery, wherein the at least one controller is further configured to command the power source to reduce the charge current applied to the battery.

17. The vehicle of claim 16, wherein the adjustable power source includes an on-board solar panel, an on-board generator, an interface for receiving power from an off-board solar panel, or an interface for receiving power from an off-board charging device.

18. The vehicle of claim 15, wherein the at least one controller is further configured to disable the charge current applied to the battery in response to the cells of the battery being balanced and the battery being fully charged.

19. The vehicle of claim 15, wherein the at least controller is further configured to reduce the charge current applied to the battery to less than the threshold voltage divided by the predefined resistance, thereby allowing discharge of the cells of the battery achieving the threshold voltage and charge of at least one other cell of the battery.

20. The vehicle of claim 15, wherein the at least controller is further configured to reduce the charge current applied to the battery to the threshold voltage divided by the predefined resistance, thereby allowing neither charge nor discharge of the cells of the battery achieving the threshold voltage and charge of at least one other cell of the battery.

* * * * *